(12) United States Patent
Fruehauf et al.

(10) Patent No.: US 8,379,056 B2
(45) Date of Patent: Feb. 19, 2013

(54) DEVICE AND METHOD FOR PROVIDING A VIDEO SIGNAL OF A VIRTUAL IMAGE

(75) Inventors: Hans Holm Fruehauf, Erlangen (DE); Sandor Nagy, Nuremberg (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 919 days.

(21) Appl. No.: 12/394,193

(22) Filed: Feb. 27, 2009

(65) Prior Publication Data
US 2010/0220204 A1 Sep. 2, 2010

(51) Int. Cl.
*G09G 5/00* (2006.01)
(52) U.S. Cl. ........................................................ 345/633
(58) Field of Classification Search ................... 345/633
See application file for complete search history.

(56) References Cited

U.S. PATENT DOCUMENTS

| | | | | |
|---|---|---|---|---|
| 5,625,765 A * | 4/1997 | Ellenby et al. | ............. | 345/633 |
| 5,682,332 A * | 10/1997 | Ellenby et al. | ............. | 702/150 |
| 6,208,933 B1 * | 3/2001 | Lazar | ............. | 701/207 |
| 6,856,324 B2 * | 2/2005 | Sauer et al. | ............. | 345/633 |
| 6,898,559 B2 * | 5/2005 | Saitta | ............. | 703/1 |
| 6,917,370 B2 * | 7/2005 | Benton | ............. | 345/633 |
| 7,053,916 B2 * | 5/2006 | Kobayashi et al. | ............. | 345/633 |
| 7,190,331 B2 * | 3/2007 | Genc et al. | ............. | 345/9 |
| 7,289,130 B1 * | 10/2007 | Satoh et al. | ............. | 345/629 |
| 7,309,048 B2 * | 12/2007 | von Thal et al. | ............. | 244/135 A |
| 7,391,424 B2 * | 6/2008 | Lonsing | ............. | 345/633 |
| 8,040,361 B2 * | 10/2011 | Bachelder et al. | ............. | 345/633 |
| 2004/0189813 A1 | 9/2004 | Tanaka | | |

FOREIGN PATENT DOCUMENTS

| | | |
|---|---|---|
| DE | 10 2005 043 618 A1 | 4/2007 |
| EP | 1 180 863 A2 | 2/2002 |
| JP | 2004-112615 A | 4/2004 |
| WO | 01/13645 A2 | 2/2001 |

OTHER PUBLICATIONS

English translation of Official Communication issued in corresponding German Patent Application No. 10 2009 010 921.8, mailed on Oct. 15, 2009.
English translation of DE 10 2005 043 618 A1, May 4, 2007.

\* cited by examiner

*Primary Examiner* — Ryan R Yang
(74) *Attorney, Agent, or Firm* — Keating & Bennett, LLP (57) ABSTRACT

A device for providing a video signal of a virtual image based on a real image of a camera, the real image having an object, includes a processing device. One piece of positional information each is associated with the camera and the object. The processing device generates the video signal of the virtual image based on the real image, the positional information of the camera and the positional information of the object. The virtual image includes an illustration of the object or object information with regard to the object.

17 Claims, 8 Drawing Sheets

DEVICE AND METHOD FOR PROVIDING A VIDEO SIGNAL OF A VIRTUAL IMAGE

BACKGROUND OF THE INVENTION

Embodiments according to the invention relate to generating virtual images and, in particular, to a device and a method for providing a video signal of a virtual image based on a real image of a camera.

Video data generally only have implicit optical location or position information available, from which only the relation of visible objects to each other may be determined. A determination of a real positional information in real time is only possible via reference models within the image or cost and time consuming image processing. Cross-fading objects in video signals in real time until now necessitated a high computational analysis and processing of the video image, without the possibility to resolve the ambiguity of depth with regard to size independent of the object and doubtlessly.

Real time location systems exist which are able to measure the positions of objects within a certain area to the accuracy of only a few centimeters. Examples are Fraunhofer Witrack, Differential GPS or Ubisense. The position of the objects may be illustrated as a virtual 3D view in the user interface.

Further, there are fully automatically controllable camera systems whose exact alignment and also position may be determined by integrated sensors or odometry. Also the position to be expected may be used, to which the camera is controlled, as far as highly accurate camera heads are used.

Cameras may, for example, also be controlled based on data from a location system.

On the other hand, there are different systems for cross-fading video signals in real time from two or more sources of analog or digital video signals, and the same already enable fading-in additional information (e.g. date, time, running text . . . ) into running video images in real time. Further, cross-fading is possible with predefined graphics and animations. Video processing systems like face recognition already allow fading-in image data supported information. The image processing overhead is very high, however.

SUMMARY

According to an embodiment, a device for providing a video signal of a virtual image based on a real image of a camera, wherein the real image has an object, and wherein one piece of positional information each is associated with the camera and the object, may have: a processing device, which is implemented to generate and provide the video signal of the virtual image based on the real image, the positional information of the camera and the positional information of the object, wherein the virtual image has an illustration of the object or object information with regard to the object.

According to another embodiment, a device for providing a video signal of a combined image may have: an above-mentioned device for providing a video signal of a virtual image based on a real image of a camera; and a combiner, which is implemented to combine a video signal of the real image with the video signal of the virtual image for obtaining and providing the video signal of the combined image.

According to another embodiment, a method for providing a video signal of a virtual image based on a real image of a camera, the real image having an object, and one piece of positional information being associated each with the camera and the object may have the steps of: generating the video signal of the virtual image based on the real image, the positional information of the camera and the positional information of the object, wherein the virtual image has an illustration of the object or object information with regard to the object; and providing the video signal of the virtual image.

According to another embodiment, a method for providing a video signal of a combined image with the above-mentioned method having the following further steps: combining a video signal of the real image with the video signal of the virtual image for obtaining the video signal of the combined image; and providing the video signal of the combined image.

Another embodiment may have a computer readable medium storing a computer program with a program code for performing the inventive method when the computer program stored on the computer readable medium runs on a computer or micro controller.

The embodiments according to the invention are based on the central idea that by the positional information of a camera and the positional information of the object the relative position of the object to the camera may be determined by little computational effort and that by this the position of the object in the image may be determined. Thus, it is not necessitated to identify the object in the real image by cost and time consuming image processing or image detection methods in order to determine its position. The ambiguities of depth and size in the real image is no problem any more due to the use of the positional information and may thus be resolved independent of the object and doubtlessly.

Some embodiments according to the invention include a location device to determine the positional information of the object and/or the positional information of the camera and provide the same to the processing device.

Some further embodiments according to the invention relate to a device for providing a video signal of a combined image. The device includes a device for providing a video signal of a virtual image based on a real image of a camera and a combiner. The combiner combines the video signal of the real image with the video signal of the virtual image to obtain and provide the video signal of the combined image.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
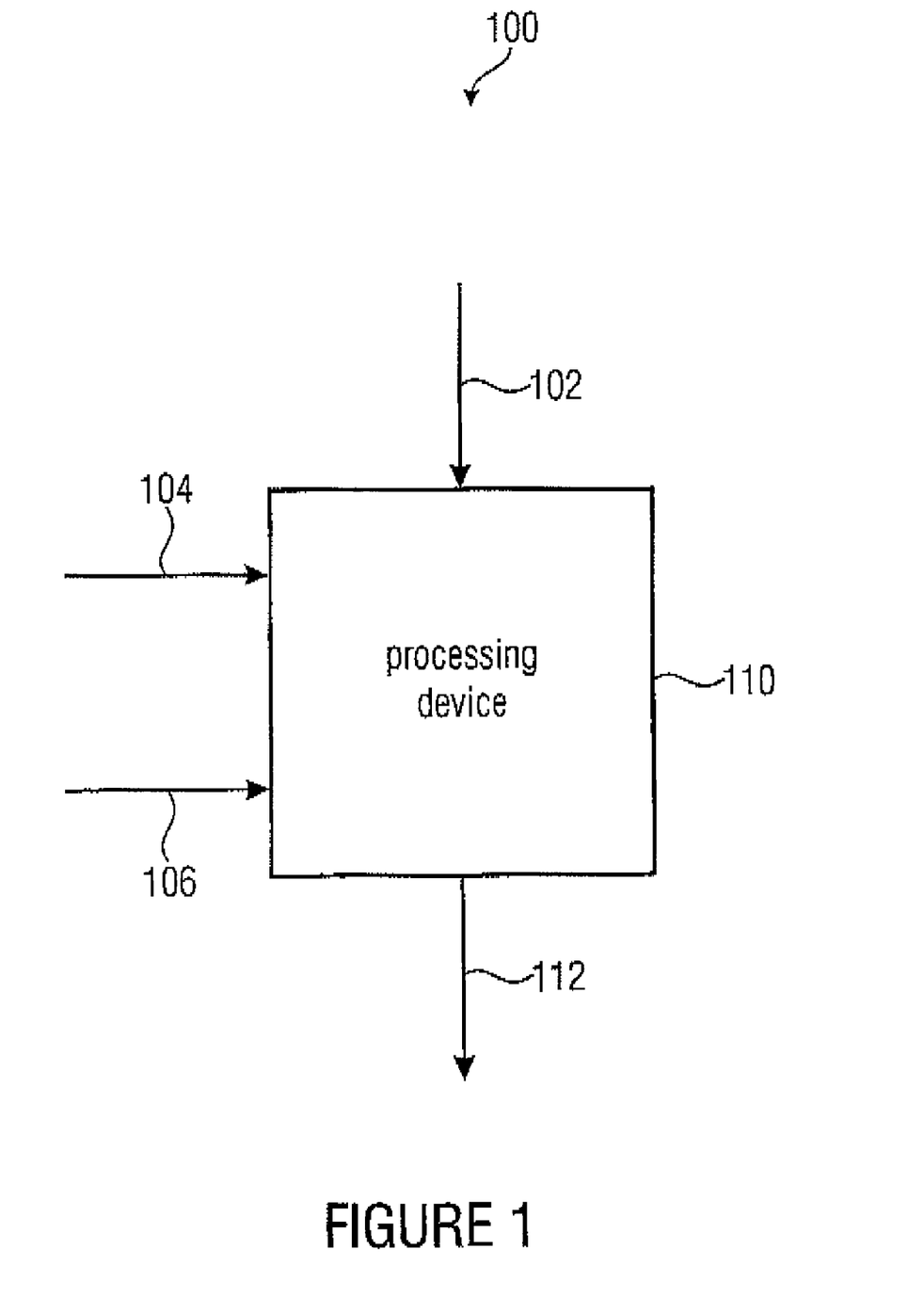
FIG. 1 is a schematical illustration of a device for providing a video signal of a virtual image.

FIG. 1 shows a schematical illustration of a device 100 for providing a video signal 112 of a virtual image based on a real image of a camera according to an embodiment of the invention. Here, the real image comprises an object and positional information are associated each to the camera and the object.

The device 100 includes a processing device 110 which generates and provides the video signal 112 of the virtual image based on the real image 102, the positional information 104 of the camera and the positional information 106 of the object. Here, the virtual image comprises an illustration of the object or object information with regard to the object.

By the positional information of the camera and the positional information of the object, with low computational effort the relative position of the object with regard to the camera may be determined. By this, for example the position of the object of the real image may be determined and the object may also be illustrated in the virtual image. As an alternative to the illustration of the object also information associated with the object may be inserted as object information at the position of the object or in the vicinity of the position of the object in the virtual image.

The illustration of the object in the virtual image may, for example, be an abstract illustration of the object, but also a simple geometrical form, like, for example, a rectangle or a circle integrated into the virtual image at the position of the object.

The object information may, e.g., be a name or a number of the object, information associated with the object or also a simple mark, as for example an arrow, a frame or a colored highlighting.

Additionally, for example, information regarding the alignment of the camera and the enlargement of the camera may be used to determine the exact position of the object in the real image. The alignment information here may give information in which direction the camera is aligned when the real image is recorded, and by the enlargement information, for example the angle of view of the camera may be determined. Using this information by simple trigonometrical calculations the position of the object in the real image may be determined.

A further important advantage of the generation of the video signal of the virtual image based on the positional information of the camera and the object is that also when the object is optically hidden in the real image, the virtual image may be generated. For this purpose it is only necessitated that the positional information of the object is present despite the optical hiding.

An object may for example be a person, an animal, a moving object, like e.g. a car or a motorcycle or an object which does not move by itself, like e.g. a container or a manufacturing product in a factory.

The positional information of the object may for example be transmitted by the object or the object may be localized by a location device.

The virtual image may e.g. illustrate an image area which corresponds to the image area of the real image. In other words, the virtual image may illustrate the same image section as the real image.

Figure 2:
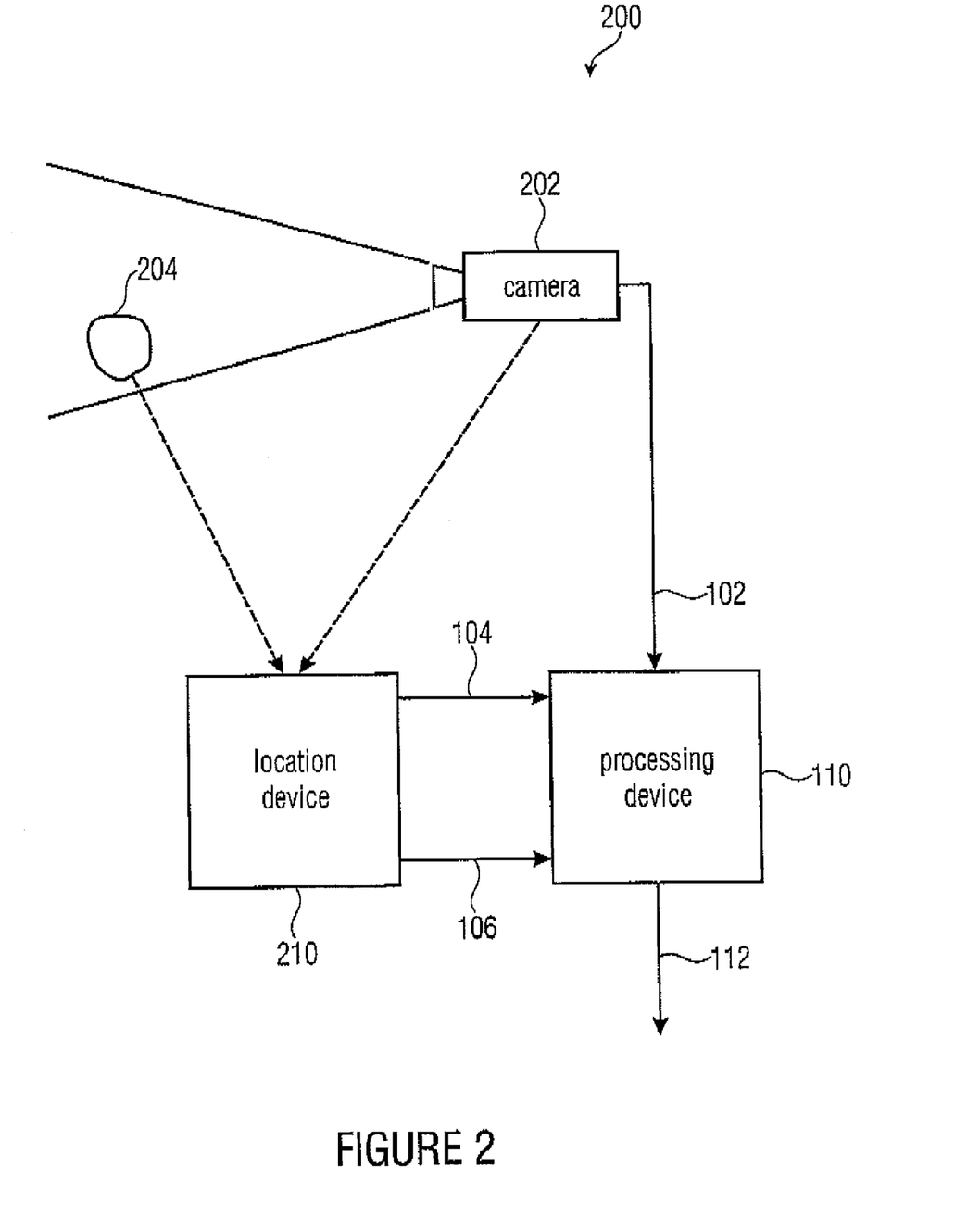
FIG. 2 is a schematical illustration of a device for providing a video signal for a virtual image.

FIG. 2 shows a schematical illustration of a device 200 for providing a video signal 112 of a virtual image based on a real image of a camera 202 according to an embodiment according of the invention. In addition to the processing device 110 illustrated in FIG. 1, the device 200 comprises a location device 210.

The location device 210 may determine the positional information of the object. For this purpose, for example a radio location method may be used. Here, the object is for example provided with a transmitter which transmits the location signals to the location device 210. The location device 210 may determine a relative or absolute position of the object 210 based on the location signals and provide the same to the processing device as positional information 104 of the object. Alternatively, the transmitter may itself determine its position at the object (e.g. by satellite navigation) and transmit the same to the location device 210 or directly to the processing device 110.

Optionally, the location device 210 may also determine the position of the camera 202 and provide the same as positional information 106 to the camera 202 of the processing device 110. By this, for example, the use of mobile or portable cameras may be facilitated.

The location device 210 may differentiate the object 204 and the camera 202 from each other for example based on identification information. Further, it is also possible to detect a plurality of objects. Here, positional information is associated with each object of the plurality of objects, and each object has different identification information. By this, the relative position of the object to the camera may be determined of each object of the plurality of objects, and thus, the position of the respective object in the real image may be determined. By this, for example, all or a part of the objects, located in the image area of the camera may be illustrated in the virtual image or object information associated with the respective object may be represented in the virtual image.

The camera 202 may pass on the video signal of the real image 102 to the processing device 110 by a direct connection. Alternatively, the video signal 102 of the real image may, for example, also be transmitted to the processing device 110 via radio.

The positional information of the camera 202 may be detected by a location device 210, as described above, or be, for example, deposited in a memory. This is e.g. possible when the camera is a firmly installed camera, which does not change its position.

The positional information 104 of the camera and the positional information 106 of the object may be provided in parallel, as indicated in FIG. 2, or for example be provided serially via a connection.

A camera system may also be directly integrated into the location system with corresponding sensors for location and position, and is then available in real time. Then also manually controlled cameras and portable cameras may be used. Also internal sensor technology (magnetic field sensor technology, rotation rate measurement means and acceleration measurement means) is available and may be used.

Figure 3:
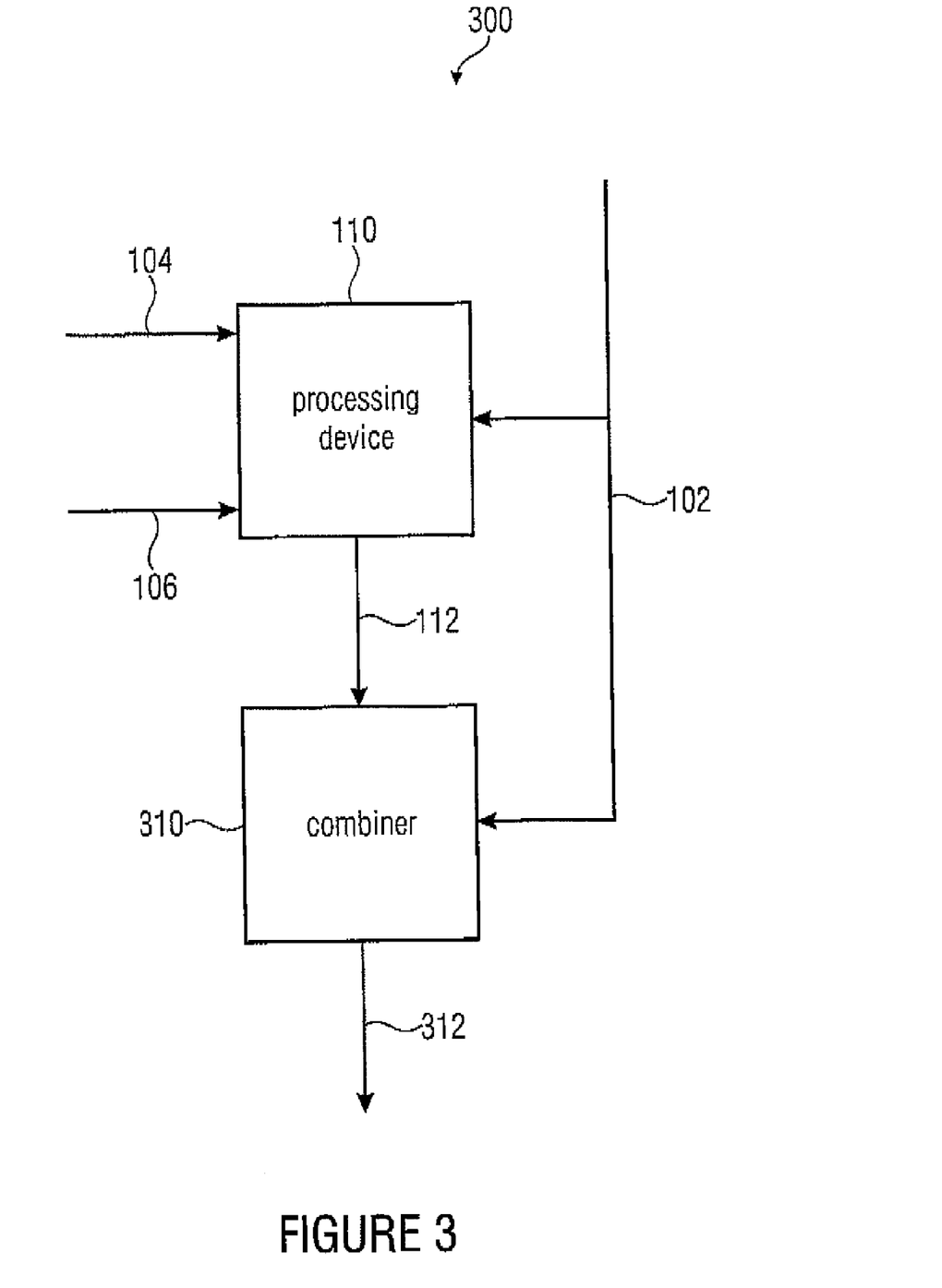
FIG. 3 is a schematical illustration of a device for providing a video signal of a combined image.

FIG. 3 shows a schematical illustration of a device 300 for providing a video signal 312 of a combined image according to an embodiment of the invention. The device 300 includes a processing device 110 and a combiner 310. The processing device 110 here corresponds to the processing device 110 illustrated in FIG. 1 and thus provides a video signal of a virtual image.

The combiner 310 combines a video signal 102 of the real image with a video signal 112 of the virtual image to obtain and provide the video signal 312 of the combined image.

The combiner 310 may here, for example, synchronize the video signal 102 of the real image and the video signal 112 of the virtual image with regard to time. By this, a real time overlap of the real image with the virtual image may be enabled.

A plurality of applications, for example, the cross-fading of objects or fading-in of information for objects may thus be enabled. For this purpose, no cost and time consuming image processing is necessitated, as the information about the position of an object in the image do not need to be gained from the real image, but may be calculated by the positional information of the camera and the positional information of the object.

The provided video signal 312 of the combined image may, for example, be compressed by a data reducer for storage or transmission. By this, the memory area or the transmission rate for transmitting the video signal may be reduced. The data reducer may be part of the combiner 310 or be an independent unit.

Figure 4:
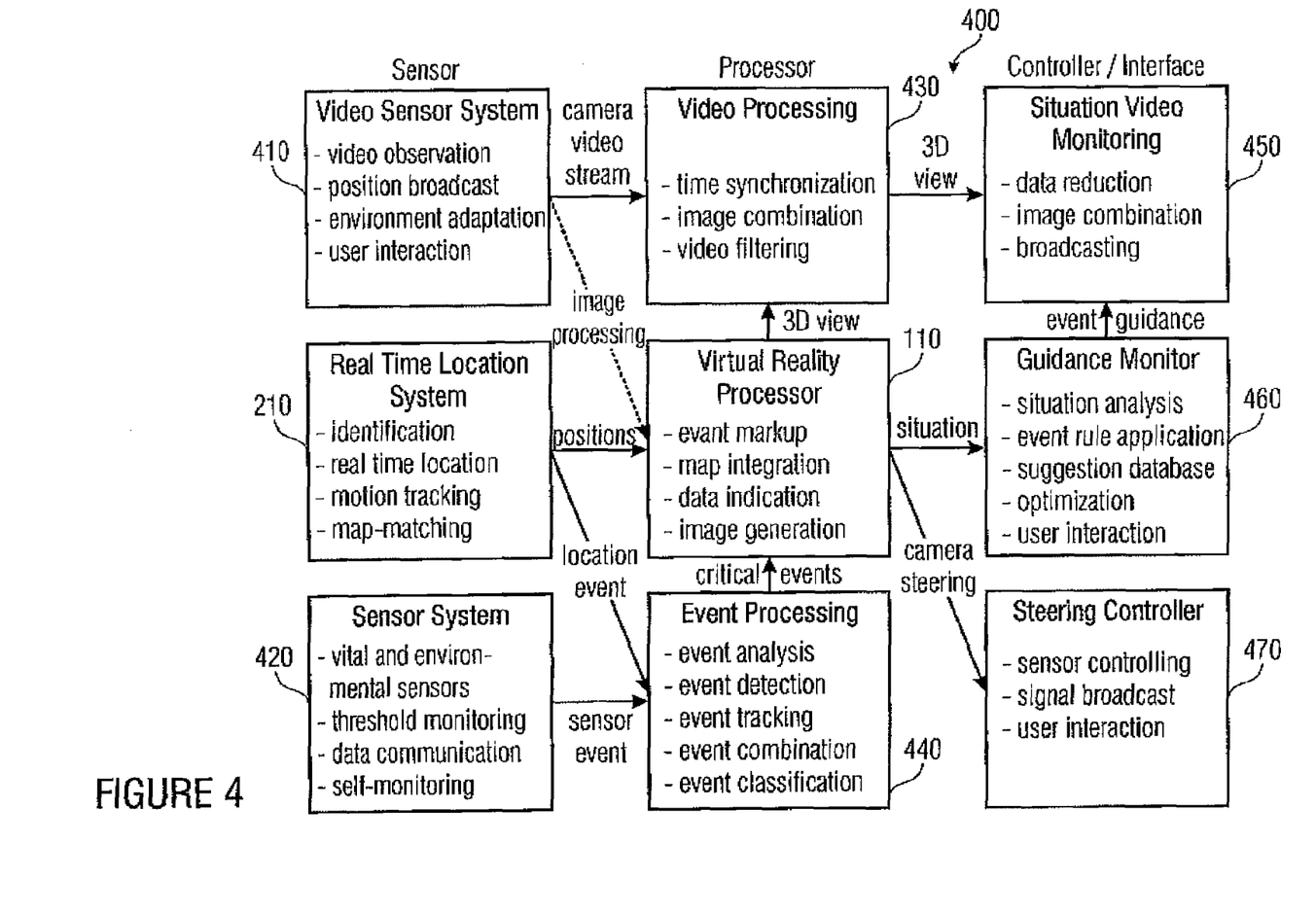
FIG. 4 is a schematical illustration of the concept for providing a video signal of a combined image.

FIG. 4 shows a schematical illustration of the concept 400 for providing a video signal of a combined image according to an embodiment of the invention.

A central unit here is a processing device 110, as it is for example illustrated in FIG. 1, and may also be referred to as a processing means or a virtual reality processor. The processing device 110 may for example be implemented as hardware especially designed for generating the video signal of the virtual image, a processor of a computer or also as a computer readable medium storing a computer program which is executed on a processor.

The combiner 310, which provides the video signal of the combined image, is part of the video processing 430 and may, for example, synchronize the real image provided by the camera of the video sensor system 410 with the video signal of the virtual image provided by the processing device 110 with regard to time and combine the real image with the virtual image. Additionally, a video filtering of the video signal may be executed on demand. If the video sensor system includes a plurality of cameras, a switch-over between the cameras may be executed when the object leaves the image area of one camera and occurs in the image area of another camera. By this, e.g. also an automatic tracking of an object may be realized.

The combiner 310 may, for example, be implemented as hardware especially designed for generating the video signal of the combined image, as a processor of a computer or also as a computer readable medium storing a computer program which is executed on a processor.

The video sensor system 410 includes at least one camera providing the real image. The camera may be an analog or a digital camera. Further, the camera may be portable, mobile or firmly installed. The camera makes a video signal of the real image available for the video processing 430 and the processing device 110. Via the same data channel, the camera may for example provide positional information, alignment information and/or enlargement information to the processing device 110. Alternatively, the positional information of the camera may be determined by a location device 210 and provided to the processing device 110. In this respect, for example, a transmitter is located at the camera transmitting a location signal to the location device 210, whereby the location device 210 may determine positional information of the camera. By this, the position of mobile and portable cameras may be determined in real time.

The video sensor system 410 may for example be used for video observation. If the video sensor system 410 includes a plurality of cameras, each camera may be localized with the help of a location device 210. Alternatively, the positional information may be transmitted to the processing device 110 by the cameras themselves or the position of the cameras may be stored in a memory and be provided. It is further possible that the positional information is determined by a part of the cameras by a location device 210, that another part transmits the positional information and/or a further part of the camera obtains the positional information from a memory.

Additionally, a camera may, for example, transmit environment adaptation parameters, like e.g. transfer the aperture setting, the focus or the enlargement. Optionally, e.g. a rain sensor, which is located at the camera, may transfer data on weather conditions to the processing device 110. The procession device 110 may use this data when creating the virtual image.

Further, for example, the video sensor system 410 may be controlled by user interaction. For example, the alignment or the enlargement of a camera may be manually changed by a user.

By a location device 210, like e.g. a real time location system, the position of one or several objects may be tracked. If, for example, a radio location system is used for this purpose, a transmitter is located at each object to be detected and the location device 210 may determine the position of each object and make the same available for the processing device 110 as positional information. To be able to differentiate the objects from each other, each transmitter may comprise a different identification. This identification information may for example be transferred with the positional information to the processing device 110. The identification of the objects may for example be executed via a radio identification code. In this connection, an object having a "tag" is mentioned. By the use of a radio location system it may, for example, be guaranteed that even when the object is optically hidden in the real image, the positional information of the object may be determined.

Through the real time localization, there is a direct connection between the real image of the camera and the determined position of the object in the real image. The real time localization system 210 may here track a movement of an object. Here, for example, also a camera may be directed to the object, so that the object remains within the image. Alternatively, a handover from one camera to another may take place when an object leaves the image area of one camera and occurs in the image area of another camera.

Additionally, the real time location system 210 may track the position of one or several objects on a map. The map may here, for example, be a road map or building plans. In other words, a map adaptation may be executed based on existing information on the surroundings. This information on the surroundings may also be integrated into the virtual image.

Additionally, for example, a sensor system 420 may be integrated. The same may e.g. be vital and environmental sensors, as for example heart frequency sensors, temperature sensors, volume sensors, acceleration sensors, gyrometers or the like. Sensor information or sensor signals may for example be transmitted to an event processing 440 which monitors the sensor information. Here, the sensor system 420 may already perform a threshold monitoring and/or a self-monitoring and control data communication with the event processing 440. The sensor information may be transmitted from the sensor system 420, e.g. also via radio, to the event processing 440.

The event processing 440 may for example determine when a sensor value transmitted by the sensor system 420 exceeds a threshold value. The thus executed detection of an event may be analyzed and e.g. be combined with another event or be tracked.

In addition to the sensor information provided by the sensor system 420 to the event processing 440, the event processing 440 may use positional information of real time location system 220 for analyzing, detecting, tracking and combining events.

If a critical event is detected, this information may, for example, be transmitted to the processing device 110. Thereupon, the processing device 110 may e.g. mark the occurred event. For example, an object which is in direct connection with the event may be marked in color, be circled, marked by an arrow, be provided with information (object information) or be highlighted in the virtual image in any other way.

Additionally, the processing device 110 may integrate map information into the virtual image which were transmitted by the real time location system 210 or come from another source. Further, an illustration of object information with regard to an object in the virtual image may be integrated. For example, the sensor values determined by the sensor system 420 which belong to an object may be integrated across, on or in the vicinity of the object in the virtual image.

By data indication, also for example distances between objects, sensor values or other information, e.g. obtained by location, image processing of the real image, the sensor system 420 or the event processing 440, may be integrated into the virtual image.

By the processing device 110, for example a virtual real time 3D image matching the real 3D image may be generated which is then superimposed onto the real image by the combiner of the video processing 430 to obtain a combined 3D view.

The video signal of the combined image may for example be used for situation video monitoring 450. For this purpose, the video signal of the combined image may simply be output at one or several screens, be stored or transmitted to another location. This may, for example, be a television transmission or a transmission into a control, regulating or primary control unit.

For this purpose, additionally, a data reduction of the video signal of the combined image may be executed, e.g. to reduce the memory requirement and/or the transmission rate in the transmission of the video signal.

By an image combination, for example, several images of different cameras may be compared or the images for example of the last five minutes may be evaluated. By this, e.g. information about the movement of an object may be given.

The processing device 110 may additionally transmit information about the situation based on the generated video signal of the virtual image or the video signal of the virtual image directed to a guidance monitor 460. The guidance monitor may analyze the situation, e.g. triggered by an event, and for example react to the same by an event rule application. Possible reactions to a situation may for example also be gained from a suggestion database or by user interaction, e.g. by asking the people in situ or at the control unit. Then, e.g. recommendations may be given based on the virtual image. Further, the guidance monitor 460 may execute an optimization, e.g. of the distribution of objects, if the objects are for example guards, based on the information of the processing device 110.

Additionally, the data of the processing device 110 can be supplied to a steering controller 470, which can perform control of the sensors or the signal transmission. For example, the alignment of the camera can be changed by user interaction.

Figure 5:
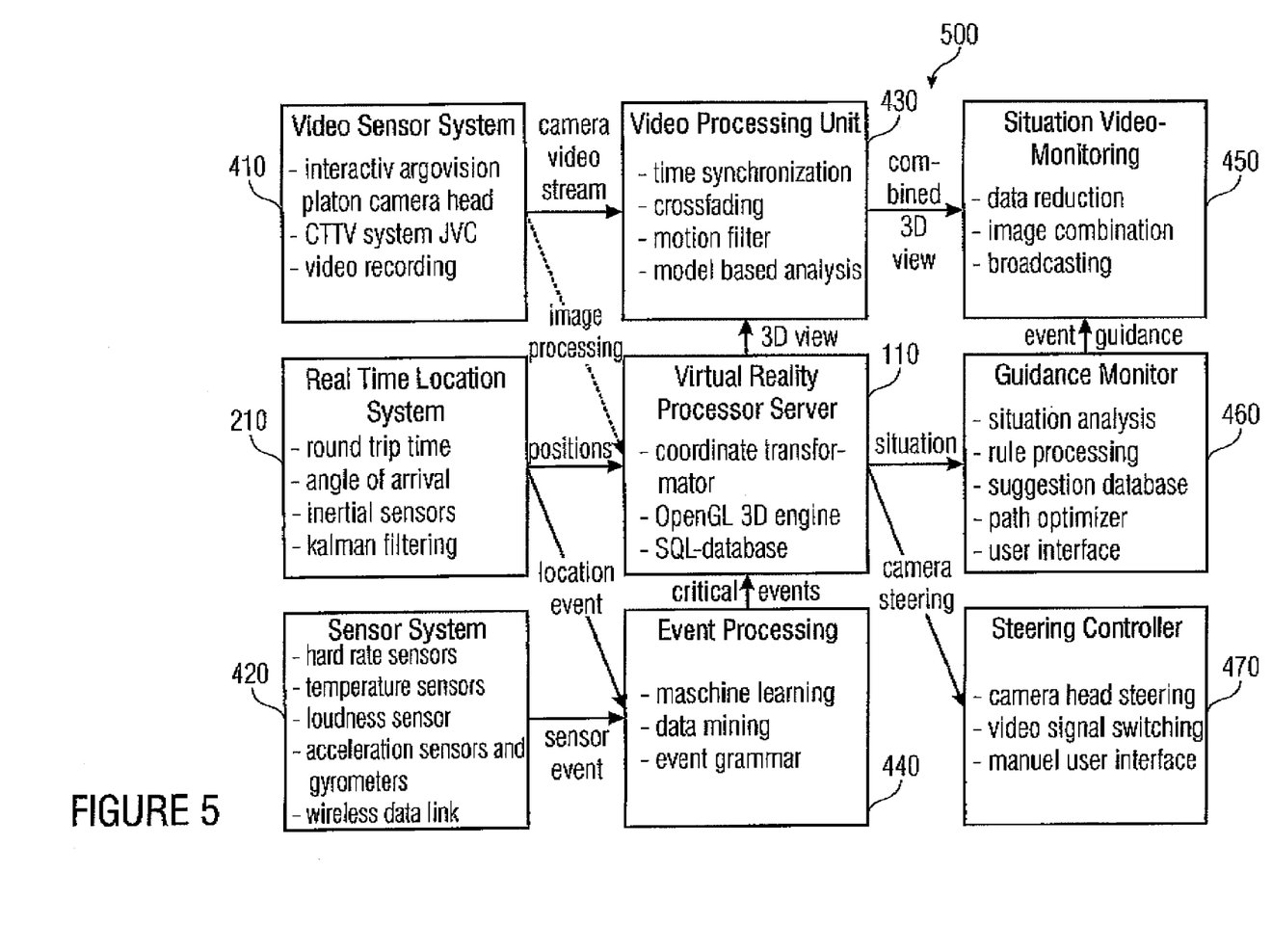
FIG. 5 is a schematical illustration of the concept for providing a video signal of a combined image.

FIG. 5 shows a schematic illustration of the concept 500 for providing a video signal of a combined image or corresponding to an embodiment according to the invention. The shown concept 500 corresponds to the concept shown in FIG. 4, however, specific implementation options are shown for the different elements.

The video sensor system 410 can, for example, comprise an interactive agrovision platon camera head, a CTTV system by JVC and a video recording device.

The real time location system 210 can be realized for example, by a roundtrip-time method or an angle of arrival method. Additionally, for example, inertia sensors or Kalman filtering can be used.

The sensor system 420 can comprise, for example, a heart rate sensor, a temperature sensor, a volume sensor, an acceleration sensor and/or a gyrometer. The data gathered by the sensors can, for example, be transmitted to the event processing 440 via a wireless data connection.

The video processing unit 430 can superimpose the two images in real time by the time synchronization of the video signal of the real image and the video signal of the virtual image, and thereby allow, for example, cross-fading of parts of the real image by the virtual image. Additionally, for example, movement filters can be used for cross-fading only changing images or image parts. Optionally, a model-based analysis such as face detection can be performed. Thereby, for example, faces can be cross-faded.

The concept 400 comprises a video sensor system 410, a real time location system 210, a sensor system 420, a video processing 430, a virtual reality processor 110, an event processing 440, a situation video monitoring 450, a guidance control 460, and a steering controller 470. Here, the video sensor system 410 is directly connected to the video processing 430 and the virtual reality processor 110 via cable or wireless, for example via a radio connection. The real time location system 210 is connected to the virtual reality processor 110 and the event processing 440. Further, the sensor system 420 is connected to the event processing 440, the event processing 440 is connected to the virtual reality processor 110, the virtual reality processor 110 to the video processing 430, the guidance control 460 to the steering controller 470, the video processing 430 is connected to the situation video monitoring 450, and the guidance control 460 is also connected to the situation video monitoring 450.

The processing device 110, or also called virtual reality processor server, can, for example, be based on an openGL machine (open graphics library), and/or an SQL database (structured query language, platform- and database-independent query language). The processing device 110 can perform a coordinate transformation between the coordinate system on which the positional information of the camera is based, the coordinate system on which the positional information of the object is based and the (perspective) coordinate system of the real image.

The event processing 440 can use its own event grammar for detecting, following, analyzing, or combining events, respectively. Further, the event processing 440 can be trained for a correct reaction to known events by a machine learning method. Additionally, a possible processing of events can be performed by data search.

The steering controller 470 can, for example, control the camera head or switch between video signals. This can also be performed manually by the user via the steering controller 470.

The situation video monitoring 450 and the guidance control 460 correspond to the example already described in FIG. 4.

Figure 6:
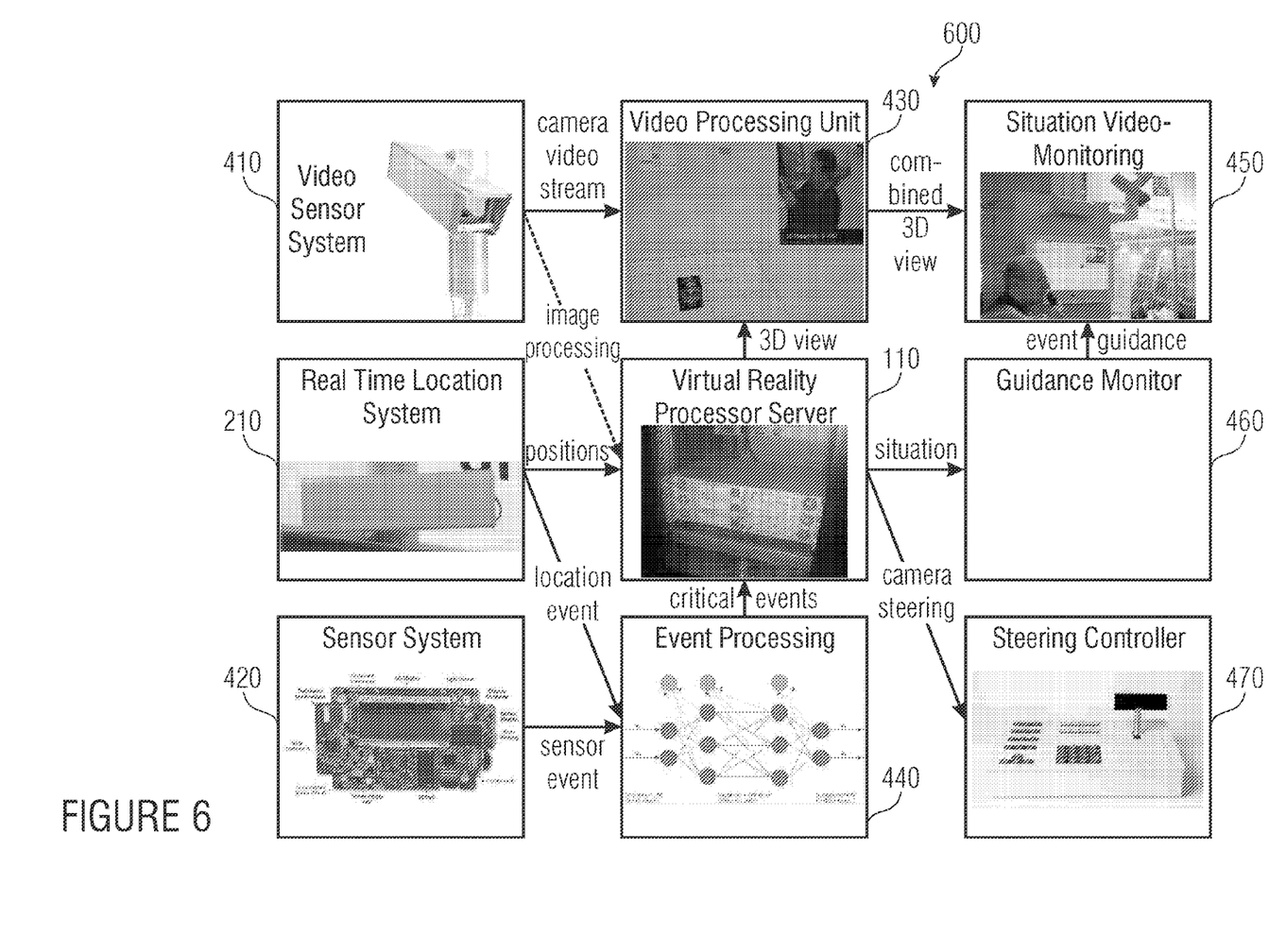
FIG. 6 is a schematical illustration of the concept for providing a video signal of a combined image.

FIG. 6 shows a schematic illustration of the concept 600 for providing a video signal of a combined image corresponding to an embodiment according to the invention. Here, the concept 600 corresponds to the concept shown in FIG. 4. Therefore, matching specific examples are visualized.

Figure 7:
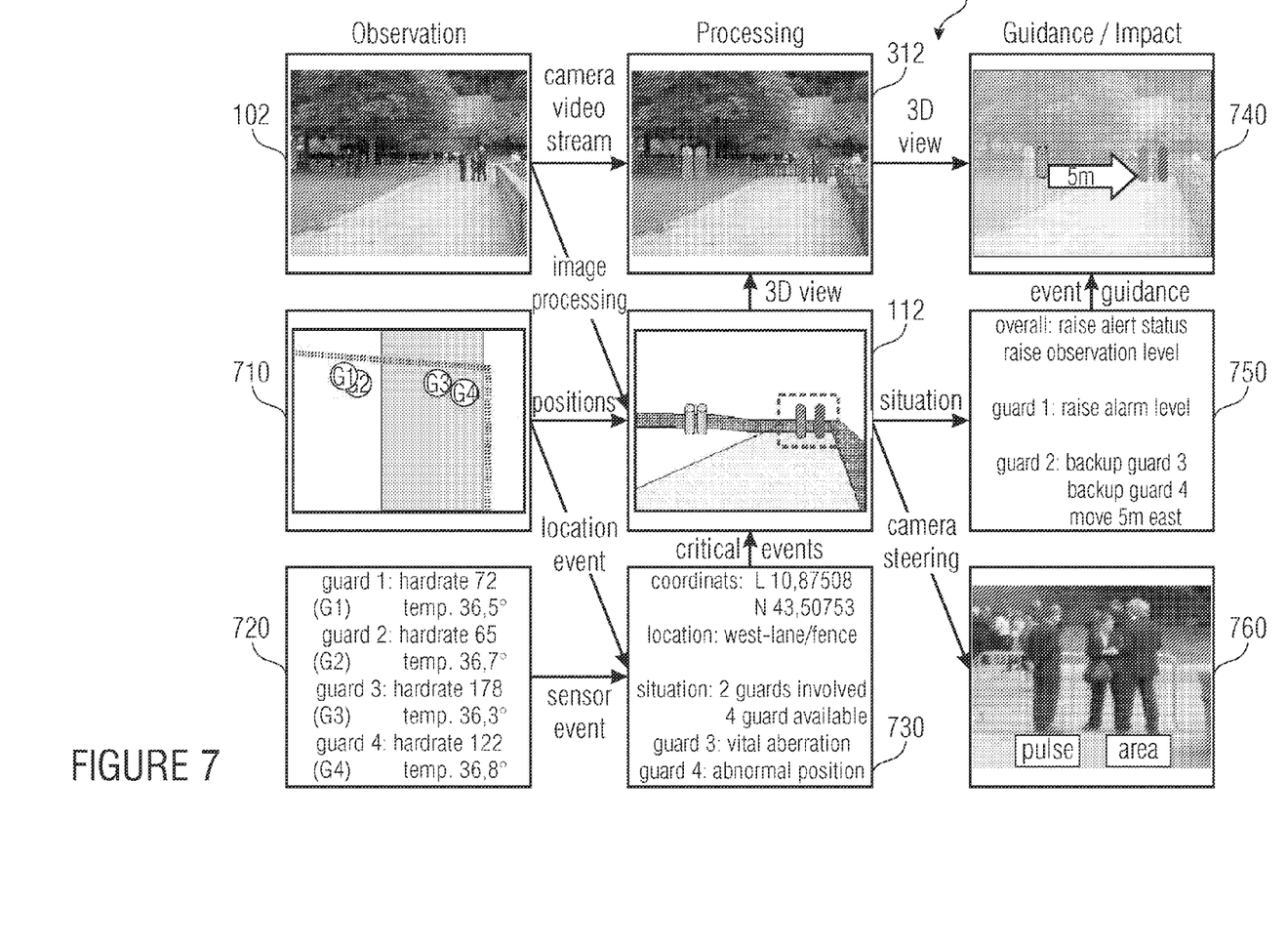
FIG. 7 is a schematical illustration of the concept for providing a video signal of a combined image as an application in security technology.

FIG. 7 shows a schematic illustration of a concept 700 for providing a video signal of a combined image as an application in the security sector corresponding to an embodiment according to the invention. The structure corresponds to the concept already described in FIG. 4.

The video sensor system 410 generates the real image 102, which shows, for example, four guards that are provided with a transmitter for location by the real time location system. The real time location system detects the positions of the four guards and can transfer additional information about the environment to the processing device. In the shown example 710, the positions of the four guards G1, G2, G3, G4, as well as the path and the barrier of the real image are marked. Based on the positional information of the camera, the positional information of the objects and the real image, the processing device can generate a virtual image 112. In this example, the virtual image 112 shows abstractly the four guards, the path and the barrier in a three-dimensional view, which corresponds to the real image.

The video processing device can generate and provide the combined image 312 from the real image 110 and the virtual image 112. The combined image shows, for example, the guards as marked objects and a barrier highlighted by the virtual image.

Additionally, the guards can, for example, be provided with heart rate sensors and temperature sensors. The sensor system 721 can determine a heart rate and a body temperature for each guard and provide the same to the event processing.

The event monitoring 730 can then, for example, detect deviations of the heart rate or the body temperature and pass on information about a critical event to the processing device. The processing device can then highlight or color, for example, a guard in the virtual image 112 corresponding to the critical event. In the present example the event processing has determined an increased heart rate of guard 3 and an abnormal position of guard 4, and has passed the critical result on to the processing device. The processing device has colored the guards 3 and 4, based on the data about the critical event. By combining the virtual image with the real image, this colored highlight also appears in the combined image 312.

The processing device can also pass the virtual image 112 on to the guidance control 750, providing the same with the possibility to react to the critical event. In the shown example, the guidance control can generally increase the alarm state and the monitoring level and/or specifically inform guard 1 to increase the alarm level and inform guard 2 to move 5 m to the east and to safeguard guards 3 and 4.

Additionally, the processing device can select, for example, a section of the virtual image, which includes the critical event and pass this information on to the control controller. The steering controller can then, for example, prompt the camera to enlarge the desired image section 760.

In this example, the situation video monitoring shows a combined image 740 where the guards are marked and where it is indicated that guard 2 should move 5 m towards the east.

In the example shown in FIG. 7, it is shown how the inventive concept can be applied to an everyday situation in the security sector. Based on the virtual image 112 and the combined image 312, it is possible to improve the judgment of such a situation and to take respective counter measures.

Figure 8:
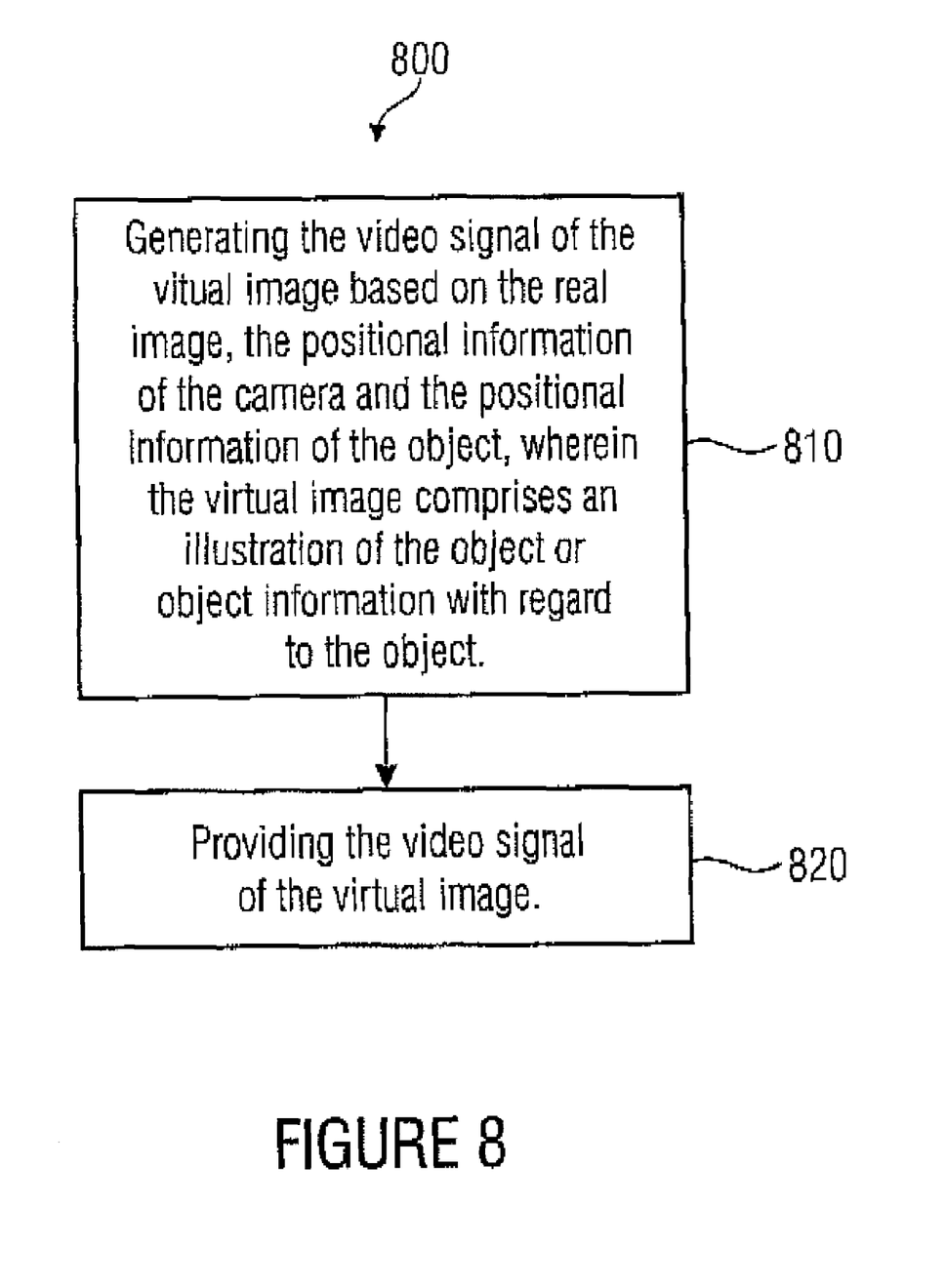
FIG. 8 is a flowchart of a method for providing a video signal of a virtual image.

FIG. 8 shows a flow diagram of a method 800 for providing a video signal of a virtual image based on the real image of a camera, wherein the real image has an object and wherein one piece of positional information each is associated with the camera and the object, comprising the steps of:

generating 810 the video signal of the virtual image based on the real image, the positional information of the camera and the positional information of the object, wherein the virtual image comprises an illustration of the object or object information with regard to the object; and providing 820 the video signal of the virtual image.

Some embodiments according to the invention relates to a method for providing a video signal of a combined image. The method comprises generating a video signal of a virtual image, combining a video signal of a real image with a video signal of the virtual image for obtaining the video signal of the combined image, and providing the video signal of the combined image.

Here, the virtual image is based on a real image of a camera, wherein the real image has an object. One piece of positional information each is associated with the camera and the object.

Generating the video signal of the virtual image is performed based on the real image, the positional information of the camera and the positional information of the object. The virtual image comprises an illustration of the object or object information with regard to the object.

Several further embodiments according to the invention relate to a position-related information system for video images based on independent positional data.

From the object information gained from the location system (position, object identity, sensor information) and with the positional and control information of the camera (position, location, zoom), a virtual three-dimensional image or video signals, respectively can be generated, which are independent of the camera image and comprise information relevant for the application.

This image can then be mixed or cross-faded in areas, respectively, in real time and synchronously with the real camera image. Thus, a superimposition of images from independent data sources can be performed, which can, in combination, make it possible that realizations about observed situations can be detected faster and clearer or can be gained at all. Areas for video processing having a possibly high computing effort can also be limited.

The method also allows visible, as well as invisible, highlighting of objects with positional and sensor information in the video signal (object watermarking). This represents, for example, a significant extension of the so-far known geotagging of complete images.

The cross-faded image can be made available for the user, e.g. the cameraman, directly during recording.

Some embodiments according to the invention relate to an application of the described concept, for example, for:
1. Sports-television images: Marking events in real time with possible interaction by the user by switching information in and off;
2. Monitoring technique: Marking critical events, inserting indications, cross fading features for protecting privacy;
3. Health care: Protecting privacy by "virtual cameras" and fading in of real images only at critical events;
4. Video post-processing, e.g. cross-fading persons by animated figures in real time, in particular in 3D-productions.

In the present invention, the same reference numbers are used for objects and functional units having the same or similar functional properties.

In particular, it should be noted that depending on the circumstances, the inventive scheme can also be implemented in software. The implementation can be performed on a digital storage medium in particular a disc or a CD with electronically readable control signals that can cooperate with a programmable computer system such that the respective method is performed. Thus, generally, the invention also consists of a computer program product with a program code stored on a machine-readable carrier for performing the inventive method when the computer program product runs on a computer. In other words, the invention can be realized as a computer program with a program code for performing a method when the computer program product runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for providing a video signal of a virtual image based on a real image of a camera, wherein the real image comprises an object, and wherein one piece of positional information each is associated with the camera and the object, the device comprising:
   a processing device, which is implemented to generate and provide the video signal of the virtual image based on the real image, the positional information of the camera, and the positional information of the object, wherein the virtual image comprises an illustration of the object or object information with regard to the object; and
   a location device, which is implemented to determine the positional information of the object and to provide the positional information of the object to the processing device, wherein the location device is configured to determine the positional information of the object based on a reception of a location signal sent by a transmitter disposed at the object or to determine the positional information of the object by receiving the positional information of the object sent by the transmitter disposed at the object, such that the positional information of the object is determined by the transmitter disposed at the object.

2. The device for providing a video signal of a virtual image according to claim 1, wherein alignment information and enlargement information is associated with the camera, wherein the processing device is implemented to detect a position of the object in the real image based on the positional information of the object, the positional information of the camera, the alignment information of the camera, and the enlargement information of the camera.

3. The device for determining a video signal of a virtual image according to claim 1, wherein the real image comprises a plurality of objects, wherein positional information and identification information is associated with every object, wherein different objects of the plurality of objects comprise different identification information, wherein the processing device is implemented to distinguish the plurality of objects based on the identification information.

4. The device for providing a video signal of a virtual image according to claim 1, wherein a sensor provides sensor information at the object, and wherein the processing device is implemented to generate the illustration of the object in the virtual image or the object information of the virtual image based on the sensor information.

5. The device for providing a video signal of a virtual image according to claim 1, wherein the location device is implemented to determine the positional information of the camera and to provide the same to the processing device.

6. The device for providing a video signal of a virtual image according to claim 1, wherein the processing device is implemented to generate an element of the virtual image based on environmental information provided to the processing device.

7. The device for providing a video signal of a virtual image according to claim 1, wherein the processing device is implemented to generate the virtual image based on sensor information of a sensor at the camera.

8. The device for providing a video signal according to claim 1, wherein the location device is configured to determine an absolute position as the positional information of the object and to provide the determined absolute position to the processing device or wherein the transmitter determines the absolute position as the positional information of the object at the object and transmits the determined absolute position to the location device.

9. The device for providing a video signal according to claim 8, wherein the absolute position of the object is determined by satellite navigation.

10. A device for providing a video signal of a combined image, comprising:
    a device for providing a video signal of a virtual image based on a real image of a camera, wherein the real image comprises an object, and wherein one piece of positional information each is associated with the camera and the object, comprising:
    a processing device, which is implemented to generate and provide the video signal of the virtual image based on the real image, the positional information of the camera, and the positional information of the object, wherein the virtual image comprises an illustration of the object or object information with regard to the object;
    a location device, which is implemented to determine the positional information of the object and to provide the positional information of the object to the processing device, wherein the location device is configured to determine the positional information of the object based on a reception of a location signal sent by a transmitter disposed at the object or to determine the positional information of the object by receiving the positional information of the object sent by the transmitter disposed at the object, such that the positional information of the object is determined by the transmitter disposed at the object; and
    a combiner, which is implemented to combine a video signal of the real image with the video signal of the virtual image for acquiring and providing the video signal of the combined image.

11. The device for providing a video signal of a combined image according to claim 10, wherein the combiner is implemented to time-synchronize the video signal of the real image and the video signal of the virtual image.

12. The device for providing a video signal of a combined image according to claim 10, comprising a data reducer, wherein the data reducer is implemented to compress the video signal of the image for storage or transmission.

13. A method for providing a video signal of a virtual image based on a real image of a camera, the real image comprising an object, and one piece of positional information each being associated with the camera and the object, comprising:
    generating the video signal of the virtual image based on the real image, the positional information of the camera, and the positional information of the object, wherein the virtual image comprises an illustration of the object or object information with regard to the object;
    determining the positional information of the object and providing the positional information of the object to a processing device, wherein the positional information of the object is determined based on a reception of a location signal sent by a transmitter disposed at the object, or the positional information of the object is determined by receiving the positional information of the object from the transmitter disposed at the object, such that the positional information of the object is determined by the transmitter disposed at the object; and providing the video signal of the virtual image.

14. A method for providing a video signal of a combined image with a method for providing a video signal of a virtual image based on a real image of a camera, the real image comprising an object, and one piece of positional information each being associated with the camera and the object, comprising:

generating the video signal of the virtual image based on the real image, the positional information of the camera and the positional information of the object, wherein the virtual image comprises an illustration of the object or object information with regard to the object;

determining the positional information of the object and providing the positional information of the object to a processing device, wherein the positional information of the object is determined based on a reception of a location signal sent by a transmitter disposed at the object or by receiving the positional information of the object from the transmitter disposed at the object, such that the positional information of the object is determined by the transmitter disposed at the object; and providing the video signal of the virtual image, the method further comprising:

combining a video signal of the real image with the video signal of the virtual image for acquiring the video signal of the combined image; and providing the video signal of the combined image.

15. A non-transitory computer readable medium storing a computer program with program code for performing, when the computer program is run on a computer, a method for providing a video signal of a virtual image based on a real image of a camera, the real image comprising an object, and one piece of positional information each being associated with the camera and the object, the method comprising the steps of:

generating the video signal of the virtual image based on the real image, the positional information of the camera and the positional information of the object, wherein the virtual image comprises an illustration of the object or object information with regard to the object;

determining the positional information of the object and providing the positional information of the object to a processing device, wherein the positional information of the object is determined based on a reception of a location signal sent by a transmitter disposed at the object or by receiving the positional information of the object from the transmitter disposed at the object, such that the positional information of the object is determined by the transmitter disposed at the object; and providing the video signal of the virtual image, when the computer program runs on a computer or micro controller.

16. A non-transitory computer readable medium storing a computer program with program code for performing, when the computer program is run on a computer, a method for providing a video signal of a combined image with a method for providing a video signal of a virtual image based on a real image of a camera, the real image comprising an object, and one piece of positional information each being associated with the camera and the object, the method comprising the steps of:

generating the video signal of the virtual image based on the real image, the positional information of the camera and the positional information of the object, wherein the virtual image comprises an illustration of the object or object information with regard to the object;

determining the positional information of the object and providing the positional information of the object to a processing device, wherein the positional information of the object is determined based on a reception of a location signal sent by a transmitter disposed at the object or by receiving the positional information of the object from the transmitter disposed at the object, such that the positional information of the object is determined by the transmitter disposed at the object; and providing the video signal of the virtual image, the method further comprising:

combining a video signal of the real image with the video signal of the virtual image for acquiring the video signal of the combined image; and providing the video signal of the combined image, when the computer program runs on a computer or micro controller.

17. A device for providing a video signal of a virtual image based on a real image of a camera, wherein the real image includes an object, and one piece of positional information each is associated with the camera and the object, the device comprising:

a processing device, which is implemented to generate and provide the video signal of the virtual image based on the real image, the positional information of the camera, and the positional information of the object, wherein the virtual image comprises an illustration of the object or object information with regard to the object; wherein a sensor provides sensor information at the object;

the processing device is implemented to generate the illustration of the object in the virtual image or the object information of the virtual image based on the sensor information;

a location device, which is implemented to determine the positional information of the object and to provide the positional information of the object to the processing device, wherein the location device is configured to determine the positional information of the object based on a reception of a location signal sent by a transmitter disposed at the object or to determine the positional information of the object by receiving the positional information of the object sent by the transmitter disposed at the object, such that the positional information of the object is determined by the transmitter disposed at the object; and the sensor is a vital sensor.

* * * * *